United States Patent [19]
Stokes

[11] Patent Number: 5,173,185
[45] Date of Patent: Dec. 22, 1992

[54] OIL RECOVERY SYSTEM

[76] Inventor: Gary W. Stokes, 1628 Ramsey St., Alcoa, Tenn. 37701

[21] Appl. No.: 733,883

[22] Filed: Jul. 22, 1991

[51] Int. Cl.$^5$ .............................................. E02B 15/04
[52] U.S. Cl. .............................. 210/242.3; 210/393; 210/923
[58] Field of Search ............... 210/242.1, 242.3, 242.4, 210/923, 924, 393, 396, 402

[56] References Cited

U.S. PATENT DOCUMENTS

| | | | |
|---|---|---|---|
| 1,338,999 | 5/1920 | Peck | 210/924 |
| 1,516,693 | 11/1924 | Anthony | 210/242.1 |
| 2,470,418 | 5/1949 | Verner | 210/923 |
| 3,338,414 | 8/1967 | Lefke et al. | 210/923 |
| 3,536,199 | 10/1970 | Cornelius | 210/923 |
| 3,576,257 | 4/1971 | Yates | 210/923 |
| 3,617,556 | 11/1971 | Cole | 210/242.4 |
| 3,685,653 | 8/1972 | Van Stavern et al. | 210/923 |
| 3,831,756 | 8/1974 | Bhuta et al. | 210/923 |
| 3,968,041 | 7/1976 | De Voss | 210/242.3 |
| 4,100,072 | 7/1978 | Uchida et al. | 210/242.3 |
| 4,172,036 | 10/1979 | Morris | 210/924 |
| 4,178,247 | 12/1979 | Janson | 210/242.3 |
| 4,287,063 | 9/1981 | Stenzel | 210/924 |
| 4,456,536 | 6/1984 | Lorenz et al. | 210/923 |
| 4,549,970 | 10/1985 | Ek et al. | 210/923 |
| 4,555,338 | 11/1985 | Marchionda | 210/242.4 |
| 4,575,426 | 3/1986 | Littlejohn et al. | 210/924 |
| 4,957,636 | 9/1990 | Wilson et al. | 210/242.3 |
| 4,978,448 | 12/1990 | Jerokoms | 210/923 |

FOREIGN PATENT DOCUMENTS 2378905 9/1978 France .

Primary Examiner—Stanley S. Silverman
Assistant Examiner—Christopher Upton
Attorney, Agent, or Firm—Pitts and Brittian

[57] ABSTRACT

An apparatus for the removal of oil from large bodies of water, such as oceans. A rotating drum, whose surface is composed of a steel mesh, retrieves oil off the surface of water. An adjustable vacuum is created within the rotating drum, causing contaminated water to pass through and oil to adhere to the steel mesh of the drum. The drum transports the oil to a collection point, where a high pressure water stream from within the drum works in conjunction with a squeegee on the drum surface to remove the oil layer from the mesh. Through the use of Archimedean screws, the oil is then transported up to the collection ship to which the apparatus is attached. Unique rake tines prevent solid debris, such as seaweed, from contacting the drum and subsequently clogging the system. The configuration of the apparatus provides for the connection of several recovery drums side by side, thus expediting the collection and removal of large oil spills.

18 Claims, 5 Drawing Sheets

FIG. 2
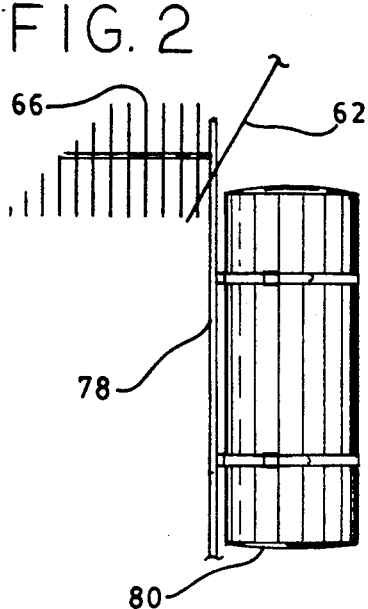
FIG. 6
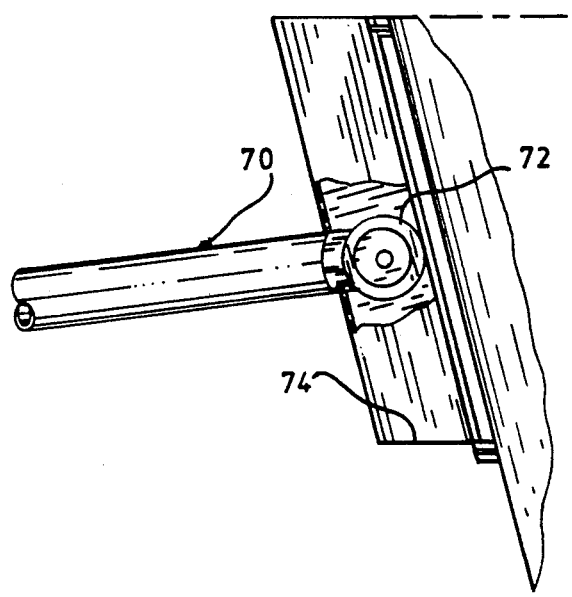
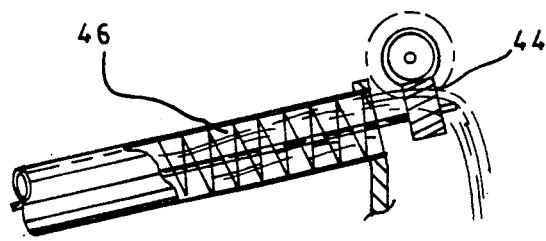
FIG. 7
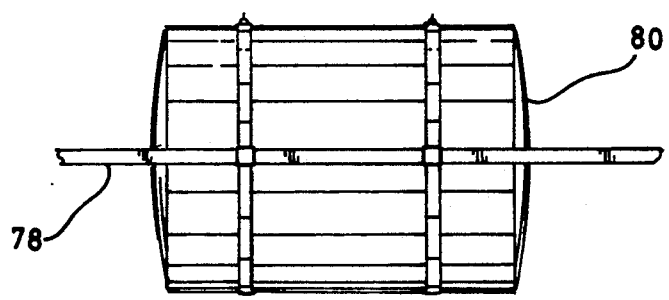
FIG. 8

OIL RECOVERY SYSTEM

DESCRIPTION

1. Technical Field

This invention relates generally to devices for removing oil from the surface of water and, in particular, to removal systems for use in the ocean employing a rotating drum with a mesh surface, an internal vacuum system, a system for removing oil from the drum, and a system for transporting the collected oil to a ship.

2. Background Art

Oil drilling and the transportation of oil in tankers has been commonplace in the world's seaways for several decades. While these operations are highly specialized, the hazardous environments in which they are performed can sometimes cause leaks or spills. In economic terms spills are very costly, as they often grow to enormous proportions, containing millions of gallons of oil and spreading over distances measured in miles. In environment terms, spills are catastrophic in that wildlife and their habitats are often irreparably damaged or destroyed. Fast and efficient recovery of the oil is essential to minimizing the economic and environmental damages incurred. To this end, several recovery systems have been developed, such as those represented in U.S. Pat. Nos. 4,555,338, 4,957,636, and 3,968,041.

U.S. Pat. No. 4,555,338 describes a system produced by T. Marchionda. This device employs an alternating clockwise/anticlockwise rotating cylinder, to remove oil from the ocean surface. The cylinder is fabricated with an oil absorbing surface to aid in oil retrieval. The system also utilizes a cage-like apparatus to remove debris and cancel the motion of the waves. A squeegee-like device is employed to remove oil from the cylinder during clockwise rotation and carry it to a collection area. From the collection area, the oil is transported to a storage ship, to which the collection system is attached. While this device may be useful in certain instances, it has some serious limitations. It can not be adjusted for variations in oil consistency and temperature, it operates too slowly to accommodate large spills, and it requires a bidirectional motor for rotation of the pickup roller.

U.S. Pat. No. 4,957,636 describes a device conceived by D. Wilson and J. Trippe. This apparatus consists of two rotating drums whose surfaces contact and remove the oil from the ocean. A squeegee on each drum removes the oil at the front of the apparatus. The oil is then transported to the back of the device and finally to a storage vessel. This device has no protection from floating debris which can clog the system, does not adjust for different types of oil, and is ill suited for operation in the open sea.

U.S. Pat. No. 3,968,041 describes an invention by E. De Voss. This device employs a rotating cylinder to push oil from the surface of the ocean onto a conveyor belt, which extends below the surface of the water. The oil adheres to the surface of the conveyor belt, and is carried to a storage ship. A cylinder on the ship, in rotation opposing the movement of the belt, removes the oil, allowing it to flow into a storage area. While useful in some cases, this apparatus has some serious flaws. It provides no measures to prevent debris, which can clog the machine, from being picked up, is inefficient in separating the oil from the ocean water, and has a complex configuration, making at-sea repairs difficult at best.

It is the intent of the present invention to provide a means for efficiently separating and removing oil from ocean water.

It is a further intent to perform the above mentioned task while diverting floating debris, thus eliminating the risk of obstruction.

It is still further the intent of the present invention to allow for the connection of several components to allow faster retrieval of large spills.

It is yet another intent of the invention to have the ability to retrieve spills containing oil of any consistency or temperature.

These and other objects of the present invention will become apparent upon the consideration of the following description with reference to the drawings referred to therein.

DISCLOSURE OF THE INVENTION

It is the purpose of this invention to efficiently remove oil from the surface of large bodies of water. A large rotating cylinder whose surface is composed of a stainless steel mesh works in conjunction with a vacuum system to separate and remove oil from the water. A squeegee and high pressure water spray system are then employed to remove the oil from the cylinder. The oil is then transported, by Archimedean screws, to the ship to which the apparatus is attached. The rotational energy of the screws is further utilized to drive the revolution of the cylinder. Unique rake tines are provided in front of the rotating drum to divert floating debris around or under the system, thus preventing obstruction of the system.

BRIEF DESCRIPTION OF THE DRAWINGS

FIG. 2 is an overhead view of an additional floatation device and its position relative to the components in FIG. 1.

FIG. 6 is a close up side view of the vertically moveable attachment between the components of FIG. 1 and the marine vessel.

FIG. 7 is a partially cut-away, close up side view of one method by which the recovered oil can be stored in the marine vessel.

FIG. 8 is a side view of the additional floatation device shown in FIG. 2, further displaying its position relative to the components of FIG. 3.

BEST MODE FOR CARRYING OUT THE DEVICE

Figure 1:
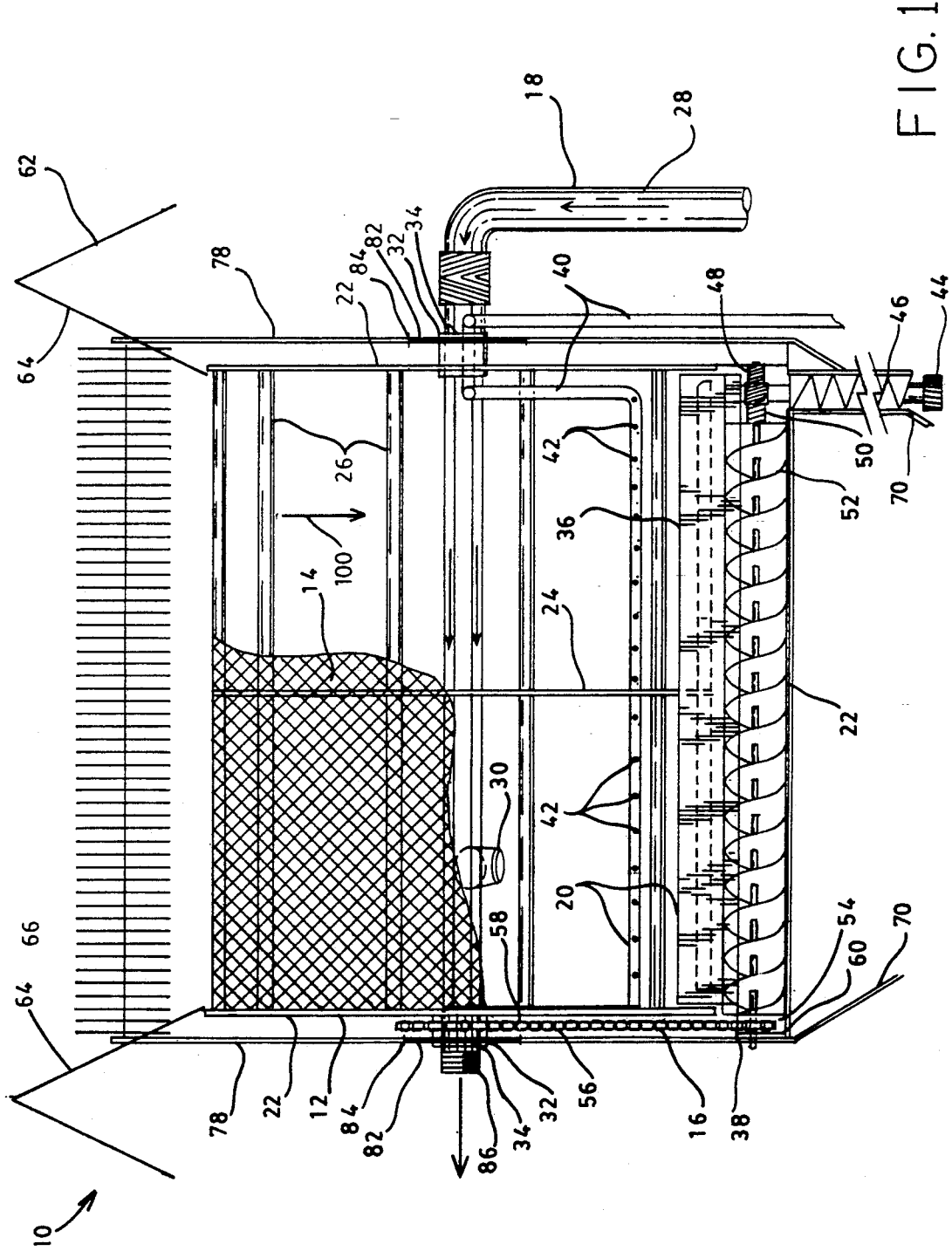
FIG. 1 is an overhead view of one embodiment of the oil recovery system and the connections therein.

A system constructed in accordance with the various features of the invention is shown in the figures generally at 10. The system 10 comprises at least an oil pickup drum 12, ventura vacuum means 18, oil capturing means 20, oil removal means 22, rotational drive means 16, and particle diversion means 62. Each of these components will be described in turn.

Figure 3:
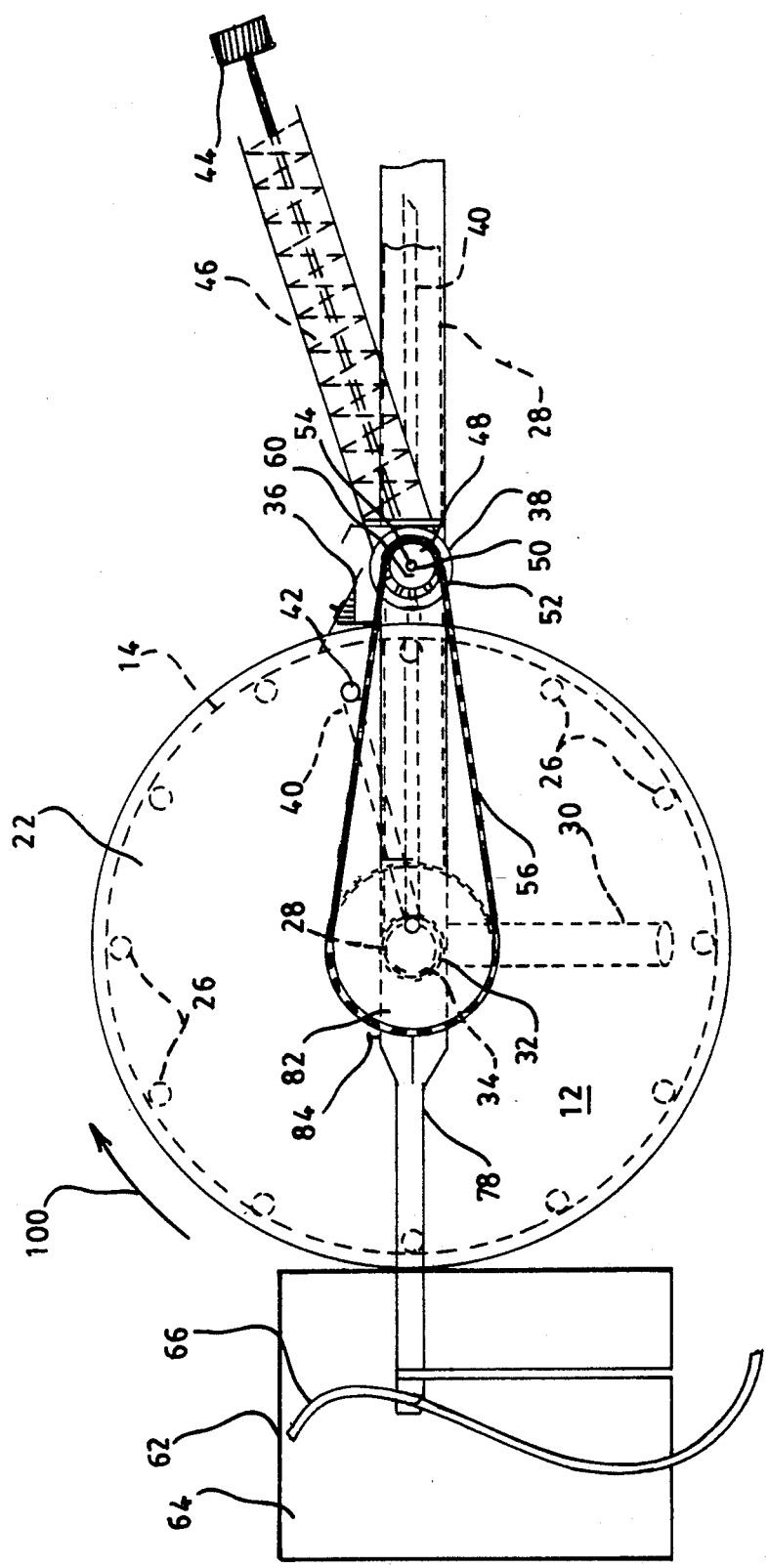
FIG. 3 is a diagram showing the side view of the components displayed in FIG. 1.

The oil pickup drum 12 comprises a support structure and a layer of stainless steel mesh which is secured by said structure. In the preferred embodiment, the support structure comprises endcaps 22 and a center support 24, connected by a plurality of longitudinal beams 26. The endcaps 22 define the outer circumference of said drum 12 and the opposite sides of said drum 12. The center support 24 is located between the endcaps 22 and functions as a stability device for the drum. Longitudinal beams 26, also shown in FIG. 3, are connected at either end to the endcaps 22 and in the center to the center support 24. The beams 26 supply support along the outer circumference of the drum and, due to their hollow construction, help keep the structure 12 afloat. The stainless steel mesh 14 is wrapped around the longitudinal beams 26 and within said endcaps 22. The configuration of mesh 14 used on the drum 12 may be changed, as required by the spill conditions.

The drum 12 is used to capture the oil from the ocean surface. Partially submerged in the water, the drum 12 rotates longitudinally about its axis, as illustrated in FIGS. 1 and 3 by arrow 100. The oil adheres to the stainless steel surface of the mesh 14, while the ocean water passes through holes in the mesh 14. How well the oil clings to the mesh 14 depends upon various conditions, such as the type of oil, its temperature, and water conditions. By using screens 14 with specific parameters, such as pore size and metal thickness, the previously mentioned conditions can be accounted for. This means the amount of oil retrieved can be maximized and the system 10 can operate as efficiently as possible.

Figure 4:
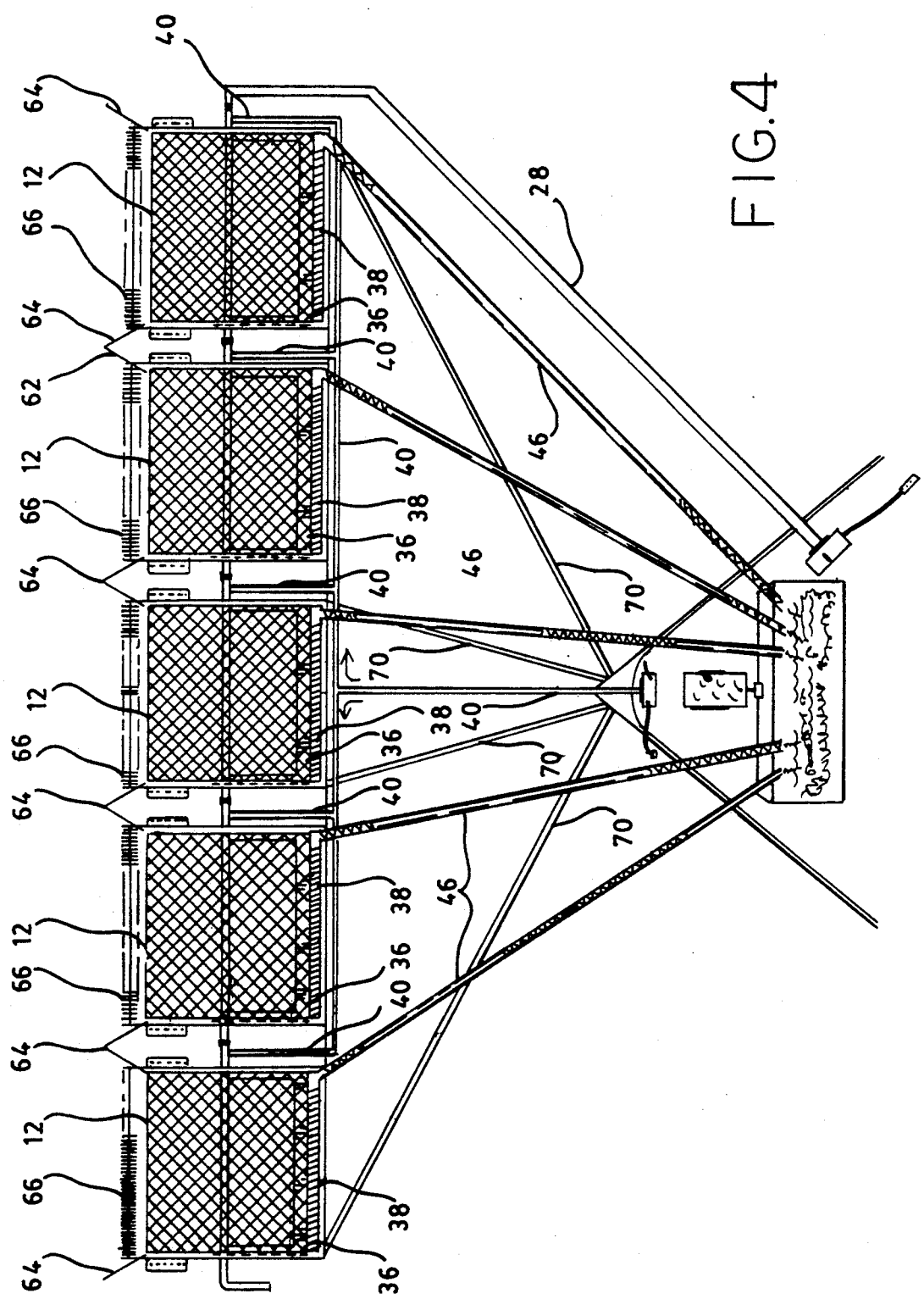
FIG. 4 is an overhead view of one possible embodiment of the components shown in FIG. 1.

The drum 12 is aided in its oil retrieval function by an internal vacuum system 18. The vacuum system 18 employs a high volume water pump (not shown) which must be contained within the ship to which the recovery system 10 is attached. This pump pushes a considerable volume of water through a large diameter pipe 28, which carries the water through the center axis of the drum 12, see FIG. 1. Within the drum the pipe 28 is connected to a ventura tube 30. The combination of the high water volume with the ventura tube 30 creates a vacuum in the drum. Once the water flowing in the pipe 28 has passed through the drum 12, it can be expelled into the ocean, or passed on to the vacuum system for the next drum 12 if several drums 12 have been connected side by side, as in FIG. 4. Threads 86 on pipe 28 allow the construction of such embodiments.

The task of the vacuum system 18 is to pull ocean water through the holes in the mesh 14 while allowing the oil to adhere to the steel mesh 14. The intensity of the vacuum can be adjusted to account for the oil type, temperature, and other conditions. The ventura water system was used in particular because it provides a constant vacuum regardless of how obstructed the pores of the mesh 14 become. By enticing the ocean water to flow through the mesh screen 14 and not stick to it, the vacuum prevents large volumes of ocean Water from being collected by the drum 12, thus improving the efficiency of the system 10.

Since the large diameter tube 28 used by the vacuum system 18 passes through the center of the drum 12, it acts as the axis upon which the drum 12 rotates. The drum 12 is rotatably mounted on the pipe 28, employing steel sleeve 32 and teflon bushing 34 on either side. This connection permits the drum 12 to rotate easily about the axis tube 28.

The oil, having been retrieved by the rotating drum 12, must be removed from the drum surface by the oil capturing system 20. The capturing system 20 consists of a high pressure water spray and a squeegee 36. The squeegee 36 contacts the exterior of the drum 12, scraping the oil off the surface of the drum 12 as it rotates. The oil then runs down the width of the squeegee 36 into a collection trough 38. To aid the squeegee 36 in the removal of oil from the drum 12, a water spray system is included. The spray system comprises a small diameter pipe 40, to which a plurality of spray nozzles 42 are attached. One end of pipe 40 is connected to a high pressure water pump (not shown) that must be contained within the ship to which the oil recovery system 10 is attached. The pipe 40 carries the water from the ship, into the drum 12, and near the inner surface of the drum 12. More specifically, the water is brought close to and parallel to the line at which the squeegee 36 and the rotating drum 12 are in contact. Located at intervals along the pipe are the spray nozzles 42 which release the high pressure water in a line just above the line of contact between the squeegee 36 and drum 12.

The water spray helps release the oil from the drum 12, and, more specifically, it removes oil from the pores of the mesh 14. Removing the oil from the holes in the mesh 14 serves several purposes: it increases the amount of oil retrieved, allows the vacuum system 18 to work more effectively, and by preventing the mesh 14 from becoming clogged with oil, it allows water to easily pass through.

Once the oil has been removed from the drum 12 and is in the collection trough 38, it must be transported up to the ship to which the recovery system 10 is attached, where it will be stored. The oil removal system 22 comprises several Archimedean screws working in tandem. A geared motor (not shown) located on the ship turns a gear 44 which is connected to the first Archimedean screw 46, as in FIG. 7. As the motor runs, the gear 44 rotates causing the screw 46 to twist. The revolution of the screw 46 causes another gear 48 located at the opposite end of the screw 46 to turn, see FIG. 1. This gear 48 drives a worm gear 50 which is attached to another Archimedean screw 52. The rotation of the second screw 52 causes the oil in the collection trough 38 to be driven to one side of the trough 38. At the end of the trough 38, on the side to which the oil is being driven, is the beginning of the first screw 46, the rotation of which carries the oil up to the ship.

In the preferred embodiment the rotation of screws 46 and 52 is also responsible for driving the oil recovery drum 12. One end of screw 52 carries the worm gear 50 which is connected to the gear 48 of screw 46, and the other end of screw 52 carries a gear 54. When the oil removal system is in operation, the rotation of screw 52 will drive gear 54. Gear 54 will then engage chain 56, causing gear 58 to rotate. Gear 58 is attached to one of the endcaps of the drum 12, and thus, through gear 58 the drum 12 is caused to rotate. Adjustment screw 60 has been provided to alter the distance between gear 54 and gear 58, thus ensuring adequate tension in chain 56.

The particle deflection means 62 comprises oil direction wedges 64 connected on either end of a plurality of debris diversion tines 66. The deflection wedges 64 are used to divert more oil into the recovery system. They concentrate the oil into a smaller area so that the drum 12 can effectively remove it from the water. As shown best in FIG. 3, the debris diversion tines 66 of the preferred embodiment substantially define an S-shaped configuration in order to push any particle that is in danger of obstructing the system 10 under the rotating drum 12. This is a very important function for if debris were to enter the oil recovery system, damage could occur to the drum 14, the squeegee 36, or the Archimedean screws 46, 52.

Figure 5:
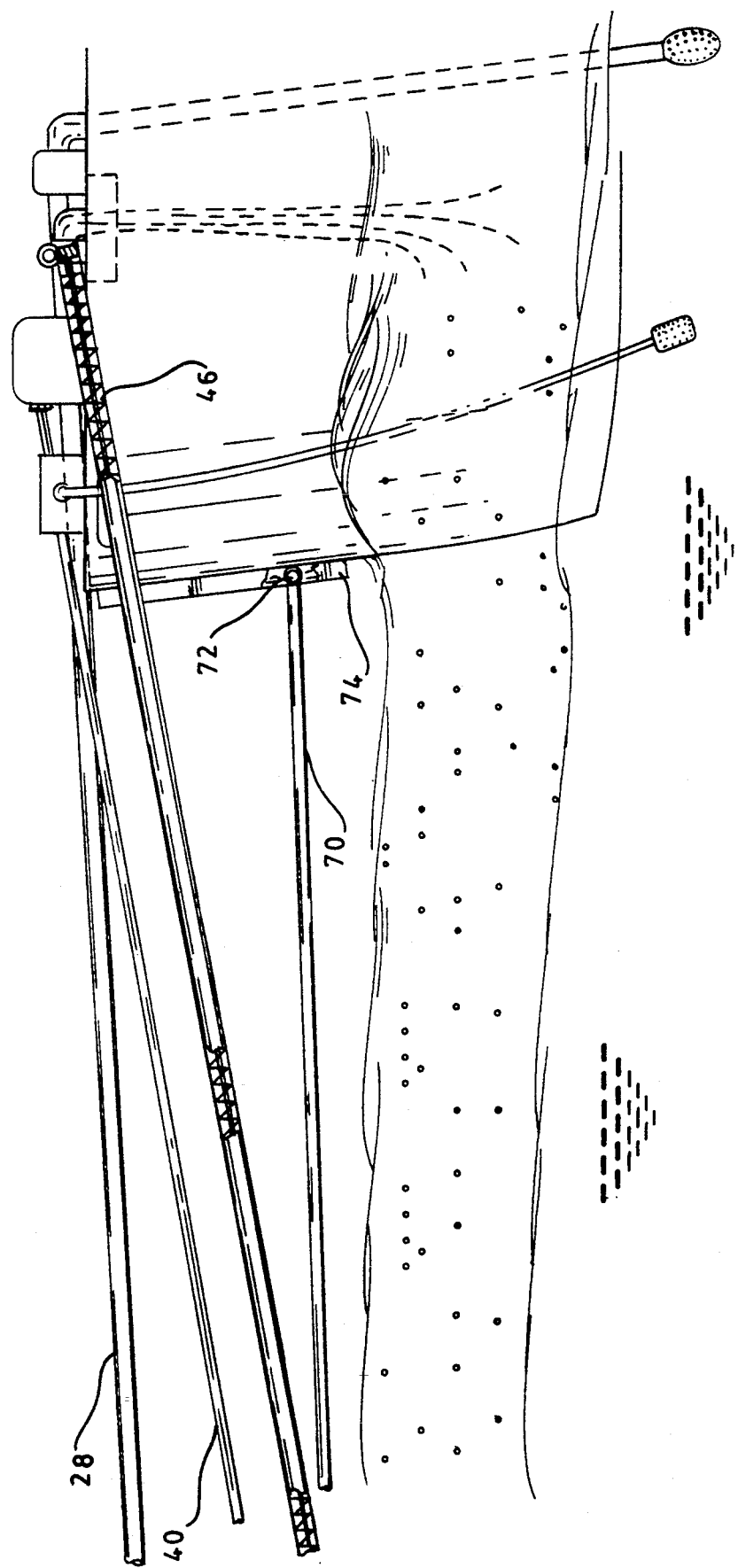
FIG. 5 is a partially cut-away diagram showing the side view of the devices used to attach the components of FIG. 1 to a marine vessel.

A support system is provided to attach the recovery system 10 to the ship and to keep the components in place. The support structure comprises beams 70 and 78, shown in FIGS. 1 and 3, rails 74, illustrated in FIGS. 5 and 6, and roller 72, pictured in FIG. 6.

In FIG. 1, beams 78 are placed on either side of the drum 12. Located in the middle of each beam 78 is a pivotally mounted bar 82. This bar 82 can be locked with a pin 84 and is used to secure sleeve 34 in a fixed position relative to beam 84, as illustrated in FIG. 3. By fixing the position of sleeve 34, drum 12 is also secured in place since the sleeve 34 and drum 12 ar directly connected.

The particle deflection means 62 can be connected to the front ends of beams 78 and beams 70 attached to the back ends, as shown in FIG. 1. Further, the back end of each beam 70 is attached to a roller 72, illustrated in FIG. 5, whereby the roller 72 is confined to vertical motion by rails 74 on the ship, pictured in FIG. 6. The rollers 72 in combination with the beams 70 allow the apparatus limited vertical movement so that the system can tolerate wave motion. The level of movement has top and bottom restrictions, as defined by rails 74, to prevent the support beams 70 from becoming submerged or detached from the ship.

The level of buoyancy the system 10 possesses is important to its operation since the rotating drum 12 must float upon the surface of the water, and should not become mired in a slew of water, oil, and machinery. If the buoyancy provided by the support rods 26 in the drum should prove insufficient, the system 10 provides for buoyancy enhancement devices so, such as those shown in FIG. 2. These large hollow drum-like objects 80 can be bolted or otherwise attached to the forward section of beam 78 for additional buoyancy.

In the detailed description above, the configuration and operation of an improved oil recovery system was described. A rotating drum, whose surface is fabricated from stainless steel mesh, works in conjunction with a vacuum system to retrieve oil from a water surface. The combined efforts of a squeegee and a water spray system is required to remove the oil from the drum, which is subsequently moved to a storage facility. Archimedean screws are used to transport the oil and to drive the rotation of the steel drum, thus keeping the entire system working in tandem. The system requires a support structure to keep everything in place, and provides for additional buoyancy attachments if necessary.

While a preferred embodiment of an oil recovery system has been shown, it will be understood that there is no intent to limit the invention to such a disclosure, but rather it is intended to cover all modifications and alternate constructions falling within the spirit and scope of the invention as defined in the appended claims.

Having thus described the aforementioned invention, I claim:

1. An apparatus for the separation and removal of oil from a body of water, said apparatus being carried by a marine vessel and comprising:

an oil pickup drum defining a substantially cylindrical configuration for extracting said oil from said water, said oil pickup drum having a perforated outer surface for the filtration of said water therethrough, said oil pickup drum being rotatably attached to said marine vessel about a longitudinal axis of said drum, said longitudinal axis being oriented substantially parallel to the horizon and substantially perpendicular to a direction of travel of said marine vessel;

a pressure differentiator means for creating a vacuum within said oil pickup drum for forcibly introducing said water through said perforated outer surface of said oil pickup drum;

an oil remover for removing said oil from said outer surface of said oil pickup drum, said oil remover including at least a blade member fixed proximate to said outer surface of said oil pickup drum and a fluid spray apparatus fixed within said oil pickup drum for spraying a selected fluid toward a selected fixed location, said selected fixed location being defined as a line at a point on said oil pickup drum above said blade member such that as said selected fluid is sprayed toward said selected fixed location, said oil is forced away from said perforated outer surface of said oil pickup drum toward said blade member, thereby assisting said blade member is removing said oil from said oil pickup drum;

an oil collector means for collecting said oil removed from said oil pickup drum;

a conveyor means carried by said marine vessel for conveying said oil removed from said oil pickup drum to a selected location;

a storage receptacle carried by said marine vessel at said selected location for collecting and storing said oil removed from said oil pickup drum and conveyed by said conveyor; and an actuator for selectively rotating said drum and activating said conveyor.

2. The apparatus for the separation and removal of oil from a body of water of claim 1 wherein said oil pickup drum perforated outer surface is a corrosion resistant mesh material defining openings of a selected diameter.

3. The apparatus for the separation and removal of oil from a body of water of claim 1 wherein said oil remover blade member is fabricated from a resilient semi-rigid material.

4. The apparatus for the separation and removal of oil from a body of water of claim 1 wherein said oil collector includes a reservoir for the deposit of said oil removed from said oil pickup drum by said oil remover.

5. The apparatus of claim 1 wherein said pressure differentiator includes a pump carried by said marine vessel for extracting said water from said oil.

6. The apparatus for the separation and removal of oil from a body of water of claim 5 wherein said pressure differentiator includes a vacuum tube for reducing the internal pressure of said oil pickup drum to a pressure below atmospheric pressure.

7. The apparatus for the separation and removal of oil from a body of water of claim 6 wherein said pressure differentiator further includes a fluid communication pipe for cooperating with said vacuum tube and said pump for evacuating fluid from within said oil pickup drum.

8. The apparatus of claim 1 wherein said oil remover further includes a pump carried by said marine vessel for removing said oil from said oil pickup drum.

9. An apparatus for the separation and removal of oil from a body of water, said apparatus being carried by a marine vessel and comprising:

an oil pickup drum defining a substantially cylindrical configuration for extracting said oil from said water, said oil pickup drum having a perforated outer surface for the filtration of said water therethrough, said oil pickup drum being rotatably attached to said marine vessel about a longitudinal axis of said drum, said longitudinal axis being oriented substantially parallel to the horizon and substantially perpendicular to a direction of travel of said marine vessel, said perforated outer surface being a corrosion resistant mesh material defining openings of a selected diameter;

a pressure differentiator means for creating a vacuum within said oil pickup drum for forcibly introducing said water through said perforated outer surface of said oil pickup drum, said pressure differentiator including at least a pump carried by said marine vessel, a vacuum tube for reducing the internal pressure of said oil pickup drum to a pressure below atmospheric pressure, and a fluid communication pipe for cooperating with said vacuum tube and said pump for evacuating fluid from within said oil pickup drum;

an oil remover for removing said oil from said outer surface of said oil pickup drum, said oil remover including at least a pump carried by said marine vessel, a blade member fixed proximate to said outer surface of said oil pickup drum and a fluid spray apparatus fixed within said oil pickup drum for spraying a selected fluid from said pump toward a selected fixed location, said selected fixed location being defined as a line at a point on said oil pickup drum above said blade member such that as said selected fluid is sprayed toward said selected fixed location, said oil is forced away from said perforated outer surface of said oil pickup drum toward said blade member, thereby assisting said blade member in removing said oil from said oil pickup drum;

an oil collector means for collecting said oil removed from said oil pickup drum, said oil collector including a reservoir for the deposit of said oil removed from said oil pickup drum by said oil remover;

a conveyor means carried by said marine vessel for conveying said oil from said oil collector to a selected location;

a storage receptacle carried by sad marine vessel at said selected location for collecting and storing said oil removed from said oil pickup drum and conveyed by said conveyor; and an actuator for selectively rotating said drum and activating said conveyor.

10. The apparatus for the separation and removal of oil from a body of water of claim 9 wherein said corrosion resistant mesh material is stainless steel.

11. The apparatus for the separation and removal of oil from a body of water of claim 9 wherein said blade member is fabricated from a resilient semi-rigid material.

12. The apparatus for the separation and removal of oil from a body of water of claim 9 wherein said conveyor includes a plurality of Archimedean-type screws carried within cooperating cylinders for conveying said oil to said marine vessel.

13. The apparatus for the separation and removal of oil from a body of water of claim 9 further comprising a debris separator means for deflecting floating debris away from said apparatus, said debris separator being affixed to said apparatus such as to intercept and deflect said floating debris before reaching said oil pickup drum.

14. The apparatus for the separation and removal of oil from a body of water of claim 13 wherein said debris separator includes a plurality of tines having a substantially S-shaped configuration such that said floating debris will be deflected underneath said oil pickup drum.

15. The apparatus for the separation and removal of oil from a body of water of claim 9 further comprising a selectably attachable float for altering the buoyancy of said apparatus as required.

16. The apparatus for the separation and removal of oil from a body of water of claim 9 further comprising connectors for selectively connecting a plurality of said apparatuses in parallel for simultaneous operation to extract said oil from said body of water.

17. The apparatus for the separation and removal of oil from a body of water of claim 16 further comprising an oil deflector means positioned proximate a leading edge of said oil pickup drum and between adjacent said oil pickup drums for drawing said oil from between said adjacent oil pickup drums thereby providing a means for preventing said oil from circumventing said apparatuses.

18. The apparatus for the separation and removal of oil from a body of water of claim 16 further comprising an oil deflector positioned proximate a leading edge of said oil pickup drum and between adjacent said oil pickup drums for deflecting said oil from between said adjacent oil pickup drums toward said adjacent oil pickup drums thereby preventing said oil from circumventing said apparatuses.

* * * * *